United States Patent
Takashimizu (10) Patent No.: US 9,710,049 B2
(45) Date of Patent: Jul. 18, 2017

(54) DISPLAY DEVICE, METHOD OF DRIVING A DISPLAY DEVICE, AND DISPLAY SYSTEM

(71) Applicant: Panasonic Liquid Crystal Display Co., Ltd., Hyogo (JP)

(72) Inventor: Satoru Takashimizu, Tokyo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 119 days.

(21) Appl. No.: 14/791,194

(22) Filed: Jul. 2, 2015

(65) Prior Publication Data

US 2017/0004789 A1 Jan. 5, 2017

(51) Int. Cl.
G09G 5/36 (2006.01)
G06F 1/32 (2006.01)
G09G 5/08 (2006.01)
G09G 5/14 (2006.01)

(52) U.S. Cl.
CPC ............. G06F 1/3265 (2013.01); G09G 5/08 (2013.01); G09G 5/14 (2013.01)

(58) Field of Classification Search
CPC ....... G09G 2320/103; G09G 2330/021; G09G 2330/027; G09G 2310/04; G06F 3/1462
See application file for complete search history.

(56) References Cited

U.S. PATENT DOCUMENTS 9,519,325 B2 * 12/2016 Byun .................... G06F 1/3206
2012/0147020 A1 * 6/2012 Hussain ................... G06T 1/00
345/522
2013/0235014 A1 9/2013 Lee et al.

FOREIGN PATENT DOCUMENTS

JP 2013-190777 A 9/2013

* cited by examiner

Primary Examiner — Hau Nguyen
(74) Attorney, Agent, or Firm — Hubbs, Enatsky & Inoue PLLC (57) ABSTRACT

In a display device, when a receiving section receives positional information representing a position of a pointer image in a display region in a first display mode, a data generating section generates display image data corresponding to a display image based on an image corresponding to internal image data stored in an internal image memory, the above-mentioned pointer image, and the above-mentioned positional information.

11 Claims, 5 Drawing Sheets

DISPLAY DEVICE, METHOD OF DRIVING A DISPLAY DEVICE, AND DISPLAY SYSTEM

BACKGROUND

1. Field of the Invention

This application relates to a display system, and more particularly, to a display system having a panel self-refresh (PSR) function.

2. Description of the Related Art

A display system includes a system unit configured to receive a video signal output from an external signal source (host), and a display device configured to receive a video signal output from the system unit to display an image. The display device includes a display panel configured to display an image, a driving circuit configured to drive the display panel, and a timing controller configured to control the drive of the driving circuit. In recent years, as a technology for reducing the power consumption of the entire display system, a PSR technology has been proposed (for example, Japanese Patent Application Laid-open No. 2013-190777).

The PSR technology refers to the following technology. When image data on a frame basis (frame image data) in the video signal output from the host is a still image, a display mode is switched from a normal mode to a still image mode (also referred to as "PSR mode"). As a result, an operation of outputting the frame image data is stopped in the system unit, and the frame image data stored in a storage section of the timing controller is used for display. With the display system having the PSR function, the output operation of the system unit can be stopped while the still image is displayed (during the period of the PSR mode), and hence the power consumption can be reduced for the display system as a whole.

SUMMARY

However, in the above-mentioned display system, when the display is performed in the PSR mode and when, for example, a user uses a pointing device such as a mouse to move a mouse cursor (pointer) displayed on a screen of the display panel, the display mode is switched from the PSR mode to the normal mode, and the system unit restarts the operation of outputting a new frame image including a moved pointer image. That is, even when the background image is unchanged, the PSR mode is canceled just by moving the pointer. Therefore, the power consumption of the display system cannot be sufficiently reduced.

This application has been made in view of the above-mentioned problem, and has an object to reduce the power consumption of the display system having the PSR function.

In order to solve the above-mentioned problem, according to one embodiment of this application, there is provided a display device, including: a timing controller configured to generate display image data based on image data output from a system unit that is externally provided; and a display panel configured to display a display image including a pointer image based on the display image data, the timing controller including: a receiving section configured to receive, from the system unit, the image data and positional information representing a position of the pointer image in a display region; an internal image memory configured to store the image data received by the receiving section as internal image data; and a data generating section configured to generate the display image data, the display device including: a first display mode of displaying, when an operation of outputting the image data is stopped in the system unit, the display image based on the internal image data stored in the internal image memory; and a second display mode of displaying, in accordance with the operation of outputting the image data in the system unit, the display image based on the image data received by the receiving section, the data generating section being configured to generate, when the receiving section receives the positional information in the first display mode, the display image data corresponding to the display image based on an image corresponding to the internal image data stored in the internal image memory, the pointer image, and the positional information.

In the display device according to one embodiment of this application, the data generating section may synthesize the pointer image with the image corresponding to the internal image data at a position corresponding to the positional information, to thereby generate the display image data corresponding to the display image.

In the display device according to one embodiment of this application, the display panel may display a still image in the first display mode, and may display a moving image in the second display mode.

In the display device according to one embodiment of this application, in the first display mode, the receiving section may not receive the image data, but may receive the positional information representing the position of the pointer image.

The display device according to one embodiment of this application may further include a pointer image memory configured to store pointer image data corresponding to the pointer image, and, when the receiving section receives the positional information in the first display mode, the data generating section may generate the display image data corresponding to the display image based on the image corresponding to the internal image data stored in the internal image memory, the pointer image corresponding to the pointer image data stored in the pointer image memory, and the positional information.

In the display device according to one embodiment of this application, when the display device is activated, the pointer image data output from the system unit may be stored in the pointer image memory.

According to one embodiment of this application, there is provided a method of driving a display device, the display device including: a timing controller configured to generate display image data based on image data output from a system unit that is externally provided; and a display panel configured to display a display image including a pointer image based on the display image data, the timing controller including: a receiving section configured to receive, from the system unit, the image data and positional information representing a position of the pointer image in a display region; an internal image memory configured to store the image data received by the receiving section as internal image data; and a data generating section configured to generate the display image data, the method of driving the display device including: a first display mode of displaying, when an operation of outputting the image data is stopped in the system unit, the display image based on the internal image data stored in the internal image memory; and a second display mode of displaying, in accordance with the operation of outputting the image data in the system unit, the display image based on the image data received by the receiving section, the data generating section being configured to generate, when the receiving section receives the positional information in the first display mode, the display image data corresponding to the display image based on an image corresponding to the internal image data stored in the internal image memory, the pointer image, and the positional information.

According to one embodiment of this application, there is provided a display system, including: a system unit configured to transmit image data and positional information representing a position of a pointer image in a display region; a timing controller configured to generate display image data based on the image data output from the system unit; and a display panel configured to display a display image including the pointer image based on the display image data, the system unit including a position detecting section configured to detect the position of the pointer image in the display region, the timing controller including: a receiving section configured to receive the image data and the positional information from the system unit; an internal image memory configured to store the image data received by the receiving section as internal image data; and a data generating section configured to generate the display image data, the display system including: a first display mode of displaying, when an operation of outputting the image data is stopped in the system unit, the display image based on the internal image data stored in the internal image memory; and a second display mode of displaying, in accordance with the operation of outputting the image data in the system unit, the display image based on the image data received by the receiving section, the data generating section being configured to generate, when the receiving section receives the positional information in the first display mode, the display image data corresponding to the display image based on an image corresponding to the internal image data stored in the internal image memory, the pointer image, and the positional information.

In the display system according to one embodiment of this application, in the first display mode, the system unit may not transmit the image data, but may transmit the positional information detected by the position detecting section to the timing controller.

In the display system according to one embodiment of this application, the system unit may transmit, to the timing controller, a first control signal representing a command to stop an output of the image data and a second control signal representing a command to execute the output of the image data.

In the display system according to one embodiment of this application, the system unit may further include an image determining section configured to determine whether the image corresponding to the image data is a still image or a moving image, and the system unit may transmit the first control signal to the timing controller at a timing at which the image is switched from the moving image to the still image, and may transmit the second control signal to the timing controller at a timing at which the image is switched from the still image to the moving image.

DETAILED DESCRIPTION

An embodiment of this application is described below with reference to the accompanying drawings. In the following, a liquid crystal display device is taken as an example, but a display device according to this application is not limited to the liquid crystal display device, and may be, for example, an organic EL display device.

Figure 1:
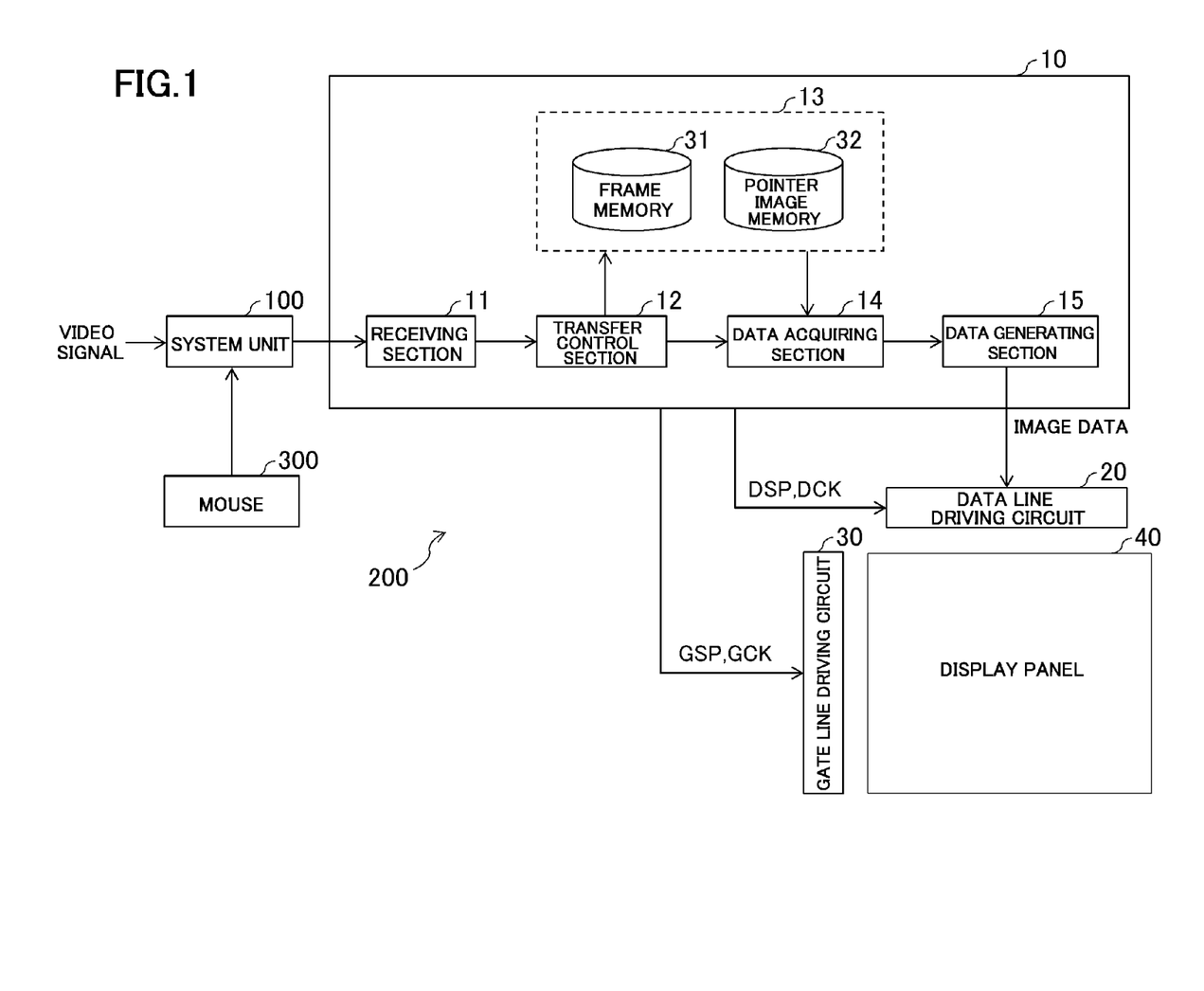
FIG. 1 is a diagram for illustrating a schematic configuration of a display system according to an embodiment of this application.

FIG. 1 is a diagram for illustrating a schematic configuration of a display system according to an embodiment of this application. The display system includes a system unit 100, a liquid crystal display device 200, and an external input device 300. The system unit 100 controls an operation of outputting image data based on a video signal supplied from an external signal source (host). For example, the system unit 100 determines, for each frame, whether a frame image corresponding to the video signal is a moving image or a still image, and controls the operation of outputting the image data based on the determination result. The liquid crystal display device 200 executes various processing for displaying an image on a display screen of a display panel 40 based on the image data output from the system unit 100.

The external input device 300 is a device (pointing device) for enabling a user to operate a pointer, an icon, a cursor, or the like displayed on the display screen of the display panel 40. Specific examples of the external input device 300 include a mouse, a keyboard, and a touch panel. In the following description, a mouse is given as an example of the external input device 300. Further, in this embodiment, an image displayed on the display screen of the display panel 40, which corresponds to the external input device 300, is referred to as "pointer image". As illustrated in FIG. 1, the mouse 300 is connected to the system unit 100 through wire communication or wireless communication.

Figure 2:
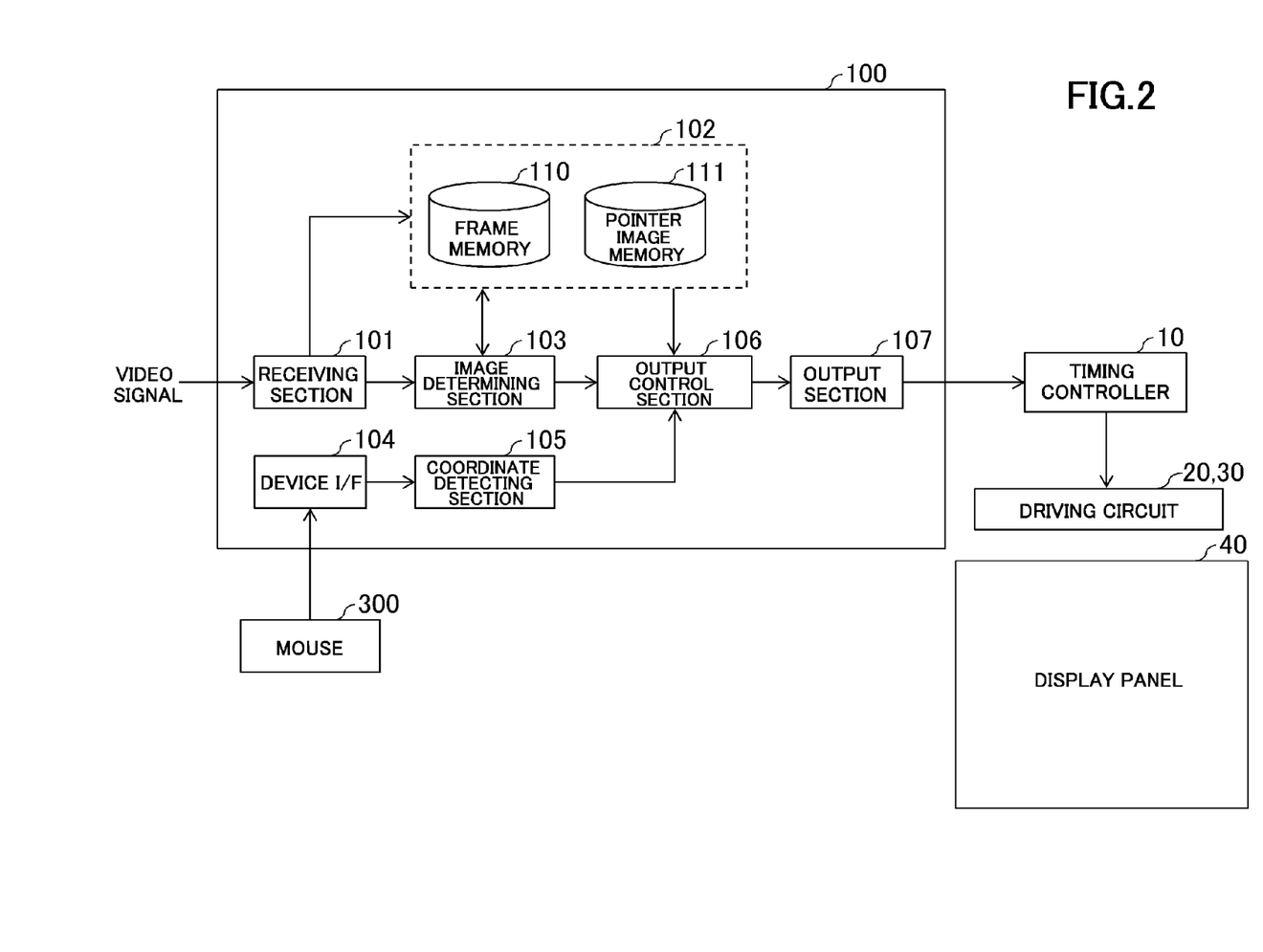
FIG. 2 is a block diagram for illustrating a specific configuration of a system unit.

Now, specific configurations of the system unit 100 and the liquid crystal display device 200 are described. FIG. 2 is a block diagram for illustrating the specific configuration of the system unit 100. The system unit 100 includes a receiving section 101, a storage section 102, an image determining section 103, an external device interface (device I/F) 104, a coordinate detecting section 105, an output control section 106, and an output section 107.

The receiving section 101 receives the video signal output from the host. The receiving section 101 transfers the received video signal to the storage section 102 and the image determining section 103 for each frame. Note that, in the following, the video signal on one frame basis is referred to as "frame image data" (or simply referred to as "image data").

The storage section 102 includes a frame memory 110 configured to temporarily store the frame image data transferred from the receiving section 101, and a pointer image memory 111 configured to store in advance data of a pointer image (pointer image data) in which a graphic of the pointer such as an arrow is rendered. In the pointer image memory 111, pointer image data corresponding to one type of pointer image may be stored, or a plurality of pieces of pointer image data corresponding to a plurality of types of pointer images may be stored. When the plurality of pieces of pointer image data are stored in the pointer image memory 111, the system unit 100 may be configured to enable the user to select a desired pointer image.

The image determining section 103 determines whether the image corresponding to the frame image data (frame image) transferred from the receiving section 101 is a moving image or a still image. Specifically, the image determining section 103 determines whether the frame image of the current frame is a moving image or a still image based on the frame image data of the current frame, which is transferred from the receiving section 101, and the frame image data of a frame that is one or a plurality of frames before the current frame, which is stored in the frame memory 110. For example, the image determining section 103 detects the difference between the frame image data of the current frame and the frame image data of the frame that is one frame before the current frame. When the detected difference is equal to or more than a threshold, the image determining section 103 determines that the current frame image is a moving image, and when the detected difference is less than the threshold, the image determining section 103 determines that the current frame image is a still image. The method of determining whether the current frame image is a moving image or a still image is not limited thereto, and a known method can be used. The image determining section 103 transfers the frame image data of the current frame, which is acquired from the receiving section 101, and the above-mentioned determination result to the output control section 106.

To the device I/F 104, the mouse 300 is connected. The connection method is not limited, and, for example, connection is established via a universal serial bus (USB).

The coordinate detecting section 105 detects coordinates (position) of the pointer in the display screen (display region) of the display panel 40. For example, the coordinate detecting section 105 detects, as an X coordinate and a Y coordinate, the position of each of pixels in an X direction and a Y direction constructing the display region, at which the pointer is positioned. The coordinate detecting section 105 transmits the detected coordinate information (positional information) to the output control section 106. The coordinate detecting section 105 transmits the coordinate information to the output control section 106 only when the pointer is moved to update the coordinate information. Note that, the coordinate detecting section 105 may transmit the coordinate information to the output control section 106 for each frame. Note that, the coordinates of the pointer can be detected by a known method.

The output control section 106 controls the operation of the system unit 100 based on the frame image data and the above-mentioned determination result, which are acquired from the image determining section 103. Specifically, when the frame image is a moving image, the output control section 106 causes the output section 107 to output the frame image data acquired from the image determining section 103. Further, when the frame image is a moving image and the coordinate information of the pointer is acquired from the coordinate detecting section 105, the output control section 106 synthesizes, based on the coordinate information, the pointer image read out from the pointer image memory 111 with the frame image acquired from the image determining section 103, and causes the output section 107 to output the synthesized frame image data. Note that, there may be used a known method as a method of displaying the pointer image.

On the other hand, when the frame image is a still image, the output control section 106 causes the output section 107 to stop the operation of outputting the frame image data. Further, when the frame image is a still image and the coordinate information of the pointer is acquired from the coordinate detecting section 105, the output control section 106 causes the output section 107 to output only the coordinate information.

In the following, a case where the system unit 100 outputs the frame image data (moving image) is referred to as "normal mode" (second display mode), and a case where the system unit 100 does not output the frame image data (still image) is referred to as "PSR mode" (low power consumption mode) (first display mode).

Further, when the frame image is switched from the moving image to the still image, the output control section 106 adds a control signal for turning on the PSR mode, that is, a first control signal PSR_ON representing a command to stop the output of the frame image data, to the frame image data corresponding to the still image, and transmits the obtained frame image data to the output section 107.

Further, when the frame image is switched from the still image to the moving image, the output control section 106 adds a control signal for turning off the PSR mode (normal mode), that is, a second control signal PSR_OFF representing a command to execute the output of the frame image data, to the frame image data corresponding to the moving image, and transmits the obtained frame image data to the output section 107.

Further, after the frame image is switched from the moving image to the still image, while the frame image data representing the still image is input to the system unit 100 (during the PSR mode period), the output control section 106 transmits only the coordinate information of the pointer to the output section 107.

Further, after the frame image is switched from the still image to the moving image, while the frame image data representing the moving image is input to the system unit 100 (during the normal mode period), the output control section 106 transmits only the frame image data to the output section 107.

The output control section 106 is not limited to the above-mentioned configuration. For example, the output control section 106 may add a flag representing a moving image (for example, flag "0") or a flag representing a still image (for example, flag "1") to each frame image data based on the above-mentioned determination result. Specifically, the output control section 106 may generate packets including the above-mentioned flag and the frame image data, and cause the output section 107 to sequentially output the generated packets.

The output section 107 outputs the frame image data, the frame image data to which the first control signal PSR_ON is added, the frame image data to which the second control signal PSR_OFF is added, and the coordinate information of the pointer, which are acquired from the output control section 106, to a timing controller 10 of the liquid crystal display device 200.

Note that, during the period of the PSR mode, the output control section 106 may stop its operation of transferring the frame image data to the output section 107, or the output control section 106 may cause the output section 107 to stop the operation of outputting the frame image data. Further, the video signal and the operation information of the pointer are continuously input even during the PSR mode, and hence each processing in the image determining section 103, the coordinate detecting section 105, and the output control section 106 is continued.

With the above-mentioned configuration of the system unit 100, while the video signal (image data) corresponding to the still image is supplied from the host (during the PSR mode period), the operation of outputting the image data is stopped in the system unit 100. Further, when the pointer is moved during the PSR mode period, without transitioning to the normal mode, only the coordinate information of the pointer is output, and the state of stopping the output of the image data is maintained. Therefore, as compared to the configuration in which the display mode transitions to the normal mode when the pointer is moved during the PSR mode period, the power consumption of the system unit 100 can be reduced.

Note that, the system unit 100 outputs various timing signals (vertical synchronizing signal, horizontal synchronizing signal, clock signal, and the like) to the liquid crystal display device 200.

Referring back to FIG. 1, the specific configuration of the liquid crystal display device 200 is described. The liquid crystal display device 200 includes the timing controller 10, a data line driving circuit 20, a gate line driving circuit 30, and the display panel 40.

The timing controller 10 executes various image processing on input frame image data. For example, the timing controller 10 adjusts the display brightness of the frame image based on the characteristics (moving image or still image) of the frame image corresponding to the frame image data output from the system unit 100. Note that, the display brightness refers to the visual brightness obtained when the frame image is displayed on the display screen of the display panel 40. Further, the timing controller 10 adjusts the position of the pointer image based on the coordinate information of the pointer output from the system unit 100.

Further, the timing controller 10 generates, based on the various timing signals output from the system unit 100, various control signals for controlling the operations of the data line driving circuit 20 and the gate line driving circuit 30 (such as a data start pulse DSP, a data clock DCK, a gate start pulse GSP, and a gate clock GCK). The timing controller 10 outputs the generated data start pulse DSP and data clock DCK to the data line driving circuit 20. Further, the timing controller 10 outputs the generated gate start pulse GSP and gate clock GCK to the gate line driving circuit 30. Note that, as the configuration for generating the above-mentioned respective control signals, a known configuration can be used, and hence the configuration is omitted in FIG. 1.

The timing controller 10 includes a receiving section 11, a transfer control section 12, a storage section 13, a data acquiring section 14, and a data generating section 15.

Figure 3:
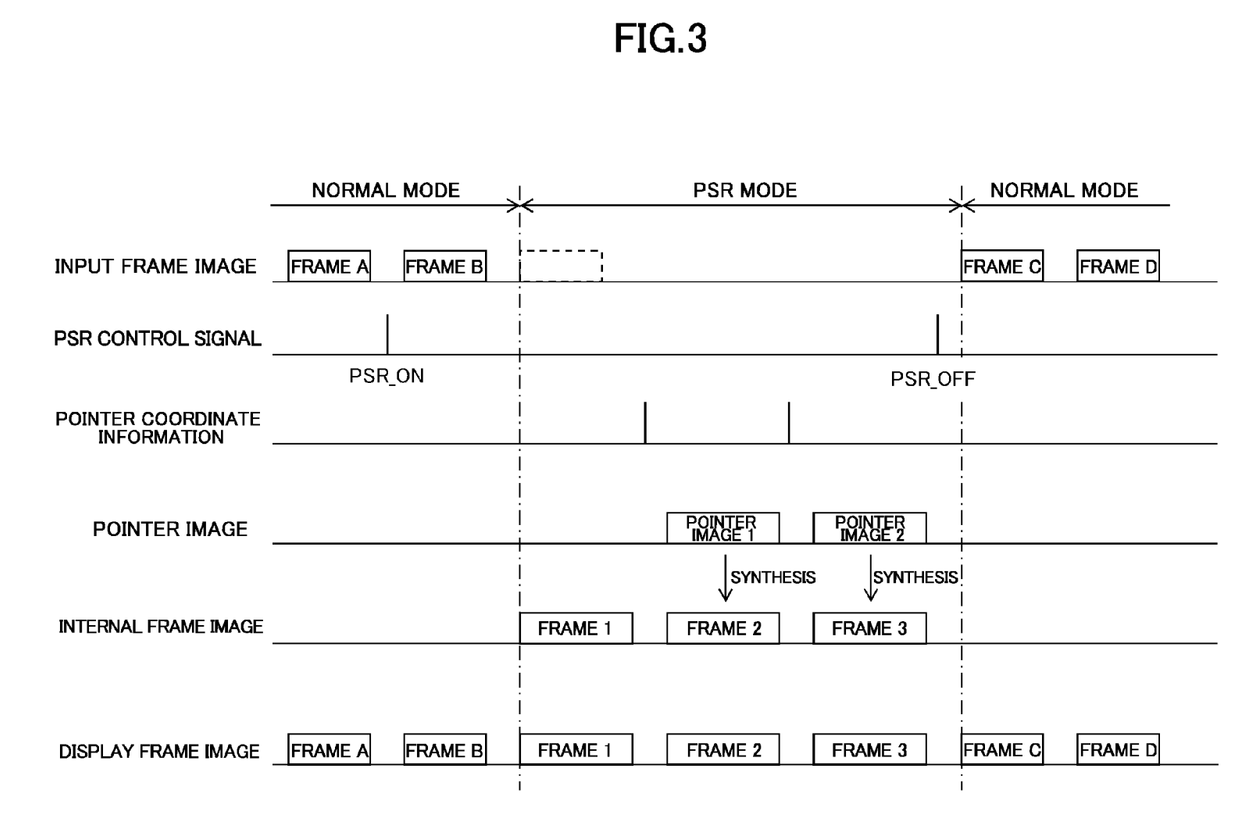
FIG. 3 is a diagram for illustrating an example of various data input to and output from a timing controller.

FIG. 3 is an illustration of an example of various data input to and output from the timing controller 10 in time series.

The receiving section 11 receives the frame image data, the frame image data to which the first control signal PSR_ON is added, the frame image data to which the second control signal PSR_OFF is added, and the coordinate information of the pointer, which are output from the system unit 100. The receiving section 11 transfers the received frame image data and coordinate information of the pointer to the transfer control section 12.

When the frame image represented by the frame image data acquired from the receiving section 11 is a still image, the transfer control section 12 transfers the frame image data to the storage section 13 and the data acquiring section 14, and transfers the coordinate information of the pointer to the data acquiring section 14. On the other hand, when the frame image represented by the frame image data acquired from the receiving section 11 is a moving image, the transfer control section 12 transfers the frame image data to the data acquiring section 14.

Specifically, when the first control signal PSR_ON is added to the frame image data acquired from the receiving section 11, the transfer control section 12 transfers the frame image data to the storage section 13 and the data acquiring section 14. On the other hand, when the second control signal PSR_OFF is added to the frame image data acquired from the receiving section 11, the transfer control section 12 transfers the frame image data to the data acquiring section 14. Further, during a period from when the frame image data to which the first control signal PSR_ON is added is input to the timing controller 10 to when the frame image data to which the second control signal PSR_OFF is added is input to the timing controller 10, the transfer control section 12 transfers the coordinate information of the pointer acquired from the receiving section 11 to the data acquiring section 14. Further, during a period from when the frame image data to which the second control signal PSR_OFF is added is input to the timing controller 10 to when the frame image data to which the first control signal PSR_ON is added is input to the timing controller 10, the transfer control section 12 transfers the frame image data acquired from the receiving section 11 to the data acquiring section 14. Note that, in the configuration in which the above-mentioned flag ("0" or "1") is added to each frame image data, the transfer control section 12 performs the processing of transferring the frame image data based on the above-mentioned flag.

In the example of FIG. 3, the transfer control section 12 transfers image data of a frame B representing a still image to the storage section 13 and the data acquiring section 14, and transfers respective pieces of image data of a frame A, a frame C, and a frame D representing a moving image to the data acquiring section 14. Note that, in this case, it is assumed that the image represented by the image data of the frame B includes the pointer image (for example, a graphic image of an arrow) as a part of the image.

The storage section 13 includes a frame memory 31 (display image memory) configured to temporarily store frame image data representing a still image, which is transferred from the transfer control section 12, and a pointer image memory 32 configured to store data of the pointer image in which the graphic of the pointer such as an arrow is rendered. The pointer image memory 32 may store the pointer image data corresponding to one type of pointer image, or a plurality of pieces of pointer image data corresponding to a plurality of types of pointer images. In the display system according to this embodiment, for example, when the power of the display system is turned on (when the display system is activated), one or a plurality of types of pointer image data stored in advance in the pointer image memory 111 of the system unit 100 may be transferred from the system unit 100 to the timing controller 10 to be stored in the pointer image memory 32. Further, when the user selects a desired pointer image, the data of the pointer image stored in advance in the pointer image memory 111 of the system unit 100 may be transferred from the system unit 100 to the timing controller 10 to be stored in the pointer image memory 32.

A "pointer image 1" and a "pointer image 2" in the pointer image of FIG. 3 are data representing one pointer image (for example, a graphic image of an arrow) stored in the storage section 13, and correspond to pieces of data whose coordinates (positions) in the display region are different from each other. Further, the pieces of image data of the "frame 1", the "frame 2", and the "frame 3" in the internal frame image of FIG. 3 correspond to image data (internal image data) representing the image of the frame B stored in the storage section 13.

The data acquiring section 14 acquires, at predetermined timings, the frame image data transferred from the transfer control section 12, the coordinate information of the pointer transferred from the transfer control section 12, the frame image data stored in the frame memory 31, and the pointer image data stored in the pointer image memory 32. The data acquiring section 14 outputs the acquired frame image data, the acquired pointer image data, and the acquired coordinate information of the pointer to the data generating section 15.

In the example of FIG. 3, in the normal mode, when the image data of the frame A is transferred from the transfer control section 12 at a predetermined timing, the data acquiring section 14 acquires the image data of the frame A, and when the image data of the frame B is transferred from the transfer control section 12 at a predetermined timing, the data acquiring section 14 acquires the image data of the frame B. Further, in the PSR mode, the data acquiring section 14 acquires the image data of the frame B stored in the frame memory 31 at a timing corresponding to a predetermined drive frequency (frame frequency). For example, in the PSR mode, the data acquiring section 14 acquires the image data at a timing corresponding to a drive frequency (for example, 48 Hz) that is lower than the drive frequency in the normal mode (for example, 60 Hz). With this, in the PSR mode, low frequency drive can be realized, and the power consumption of the liquid crystal display device 200 can be reduced. Note that, the drive frequency is set by adjusting the clock frequency, for example.

Further, in the PSR mode of FIG. 3, the data acquiring section 14 acquires the coordinate information of the pointer at an arbitrary timing. Specifically, the data acquiring section 14 acquires the coordinate information (X coordinate and Y coordinate) of the moved pointer at a timing at which the user moves the mouse. Note that, in this case, the data acquiring section 14 acquires the coordinate information only when the pointer is moved to update the coordinate information. In FIG. 3, an example of a case where the position of the pointer is moved twice is illustrated.

Further, in the PSR mode of FIG. 3, when the timing controller 10 receives the second control signal PSR_OFF, the data acquiring section 14 acquires the image data of the frame C (corresponding to the moving image).

In FIG. 3, the period including the frame A and the frame B and the period including the frame C and the frame D correspond to the normal mode. On the other hand, a display mode in which the data acquiring section 14 acquires the frame image data representing the still image and the display operation is performed based on this frame image data corresponds to the PSR mode (first display mode). In FIG. 3, the period including the frames 1 to 3 corresponds to the PSR mode.

The data generating section 15 performs image processing such as adjustment of the display brightness based on the frame image data acquired by the data acquiring section 14, and generates the frame image data for display. Further, the data generating section 15 performs the above-mentioned image processing and pointer image synthesizing processing based on the frame image data, the coordinate information of the pointer, and the pointer image data, which are acquired by the data acquiring section 14, and generates the frame image data for display. The data generating section 15 outputs the generated frame image data (digital data) to the data line driving circuit 20.

In the example of FIG. 3, in the normal mode, when the data generating section 15 acquires the image data of the frame A and the frame B from the data acquiring section 14, the data generating section 15 subjects the image data of the frame A and the frame B to the above-mentioned image processing, to thereby generate the frame image data for display. Further, in the PSR mode, when the data generating section 15 acquires the image data of the frame B from the data acquiring section 14, the data generating section 15 subjects the image data of the frame B to the above-mentioned image processing, to thereby generate the frame image data for display. Further, in the PSR mode, when the data generating section 15 acquires the image data of the frame B, the coordinate information of the pointer, and the pointer image data from the data acquiring section 14, the data generating section 15 performs, in addition to the above-mentioned image processing, processing of changing (moving) the pointer image included in the image of the frame B to a position corresponding to the above-mentioned coordinate information, to thereby generate the frame image data for display. For example, the data generating section 15 synthesizes the pointer image in a background image (entire image), which is obtained by removing the pointer image from the image of the frame B, at a position (X coordinate and Y coordinate) corresponding to the coordinate information of the pointer.

The data line driving circuit 20 supplies a grayscale voltage to a plurality of data lines DL based on the data start pulse DSP and the data clock DCK output from the timing controller 10 and the frame image data (digital data) output from the data generating section 15 of the timing controller 10. As the configuration of the data line driving circuit 20, a known configuration can be applied, and hence description thereof is omitted herein.

The gate line driving circuit 30 sequentially supplies gate signals to a plurality of gate lines GL based on the gate start pulse GSP and the gate clock GCK output from the timing controller 10. As the configuration of the gate line driving circuit 30, a known configuration can be applied, and hence description thereof is omitted herein.

Figure 4:
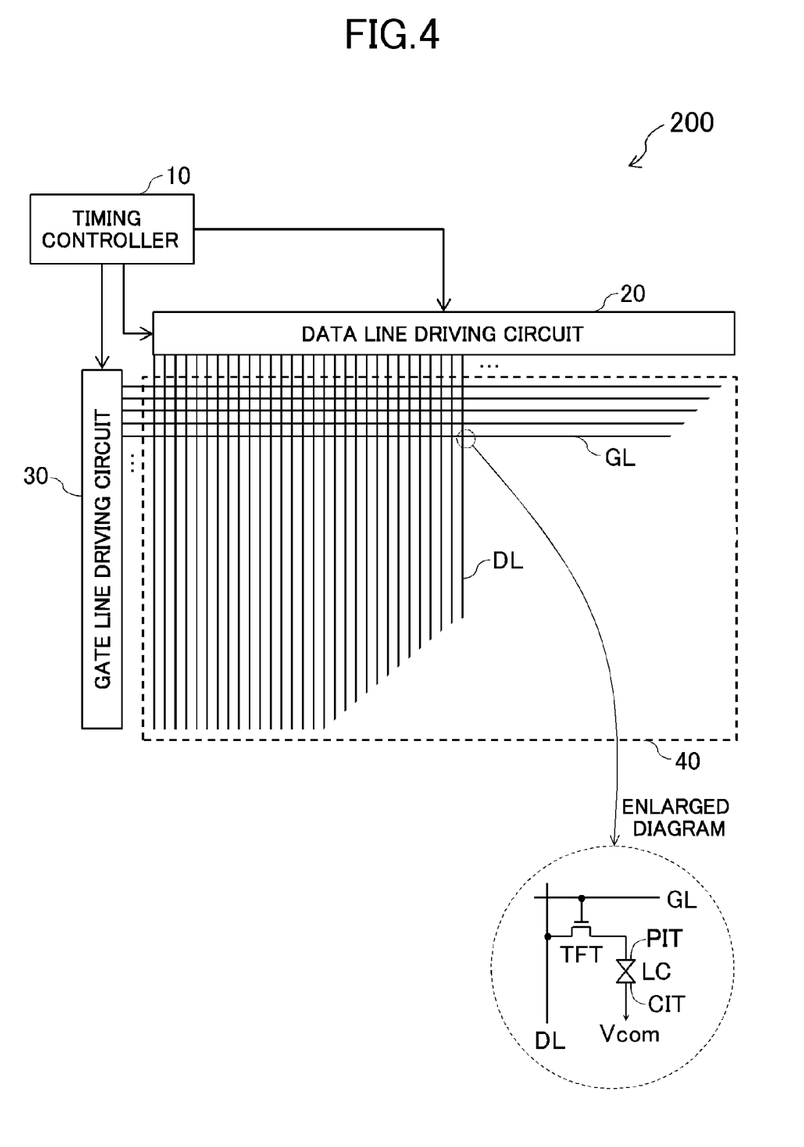
FIG. 4 is a plan view for illustrating a specific configuration of a display panel.

FIG. 4 is a plan view for illustrating a specific configuration of the display panel 40. The display panel 40 includes a thin film transistor substrate (TFT substrate) (not shown), a color filter substrate (CF substrate) (not shown), and a liquid crystal layer LC sandwiched between both the substrates. The TFT substrate includes the plurality of data lines DL connected to the data line driving circuit 20, and the plurality of gate lines GL connected to the gate line driving circuit 30. A thin film transistor TFT is arranged at each intersecting portion between the data line DL and the gate line GL. Further, in the display panel 40, a plurality of pixels are arranged in a matrix pattern (row direction and column direction) so as to correspond to the respective intersecting portions. Further, the display panel 40 includes a pixel electrode PIT and a common electrode CIT so as to correspond to each pixel. The display panel 40 turns on the thin film transistor TFT by a gate signal supplied to the gate line GL, and displays an image on the display screen based on the grayscale voltage applied to the pixel electrode PIT via the data line DL. Note that, the data line driving circuit 20 and the gate line driving circuit 30 may be formed on the TFT substrate. The display panel 40 is not limited to the above-mentioned configuration, and a known configuration can be applied thereto.

With the display system according to this embodiment, when there is no change in the background image and only the pointer is moved, the PSR mode (state of stopping the output of the image data) is maintained. Therefore, the power consumption of the display system can be reduced.

The display system according to this embodiment is not limited to the above-mentioned configuration. For example, the timing controller 10 may not include the pointer image memory 32. In this case, for example, in the PSR mode, the system unit 100 may transmit the coordinate information of the pointer and the pointer image data to the timing controller 10 every time the coordinate information of the pointer is detected. In the case of the above-mentioned configuration, when the receiving section 11 receives the coordinate information of the pointer and the pointer image data in the PSR mode, the data generating section 15 generates the frame image data for display based on the frame image corresponding to the frame image data stored in the frame memory 31 and the above-mentioned coordinate information and pointer image received from the system unit 100.

Further, the display system according to this embodiment may switch the type of the pointer image depending on the position (coordinates) of the pointer. Specifically, the pointer image memory 111 stores a plurality of pieces of pointer image data corresponding to a plurality of types of pointer images, and the output control section 106 reads out the pointer image from the pointer image memory 111 based on the coordinate information of the pointer detected by the coordinate detecting section 105. The above-mentioned configuration can be applied to the normal mode and the PSR mode. Further, in the PSR mode, the timing controller 10 may perform processing of switching the type of the pointer image. Specifically, the pointer image memory 32 stores a plurality of pieces of pointer image data corresponding to a plurality of types of pointer images, and, in the PSR mode, the data acquiring section 14 reads out the pointer image from the pointer image memory 32 based on the coordinate information of the pointer transmitted from the system unit 100. With the above-mentioned configuration, in the normal mode and the PSR mode, the pointer image based on the position of the pointer can be displayed.

Figure 5:
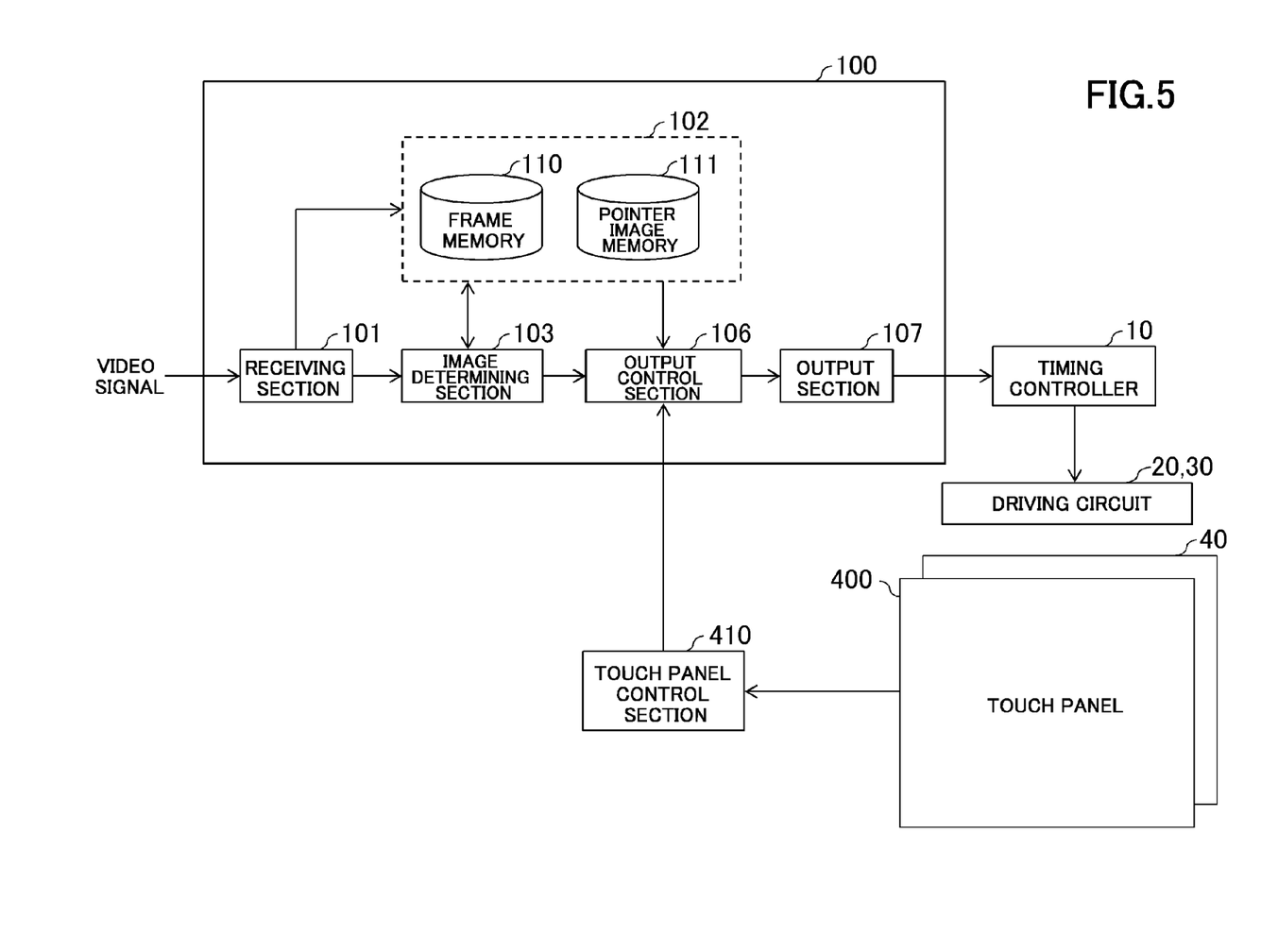
FIG. 5 is a diagram for illustrating another configuration of the display system.

In the example described above, the mouse is exemplified as the external input device 300, but the external input device 300 is not limited thereto, and may be, for example, a touch panel. FIG. 5 is a diagram for illustrating another configuration of the display system. As illustrated in FIG. 5, the display system includes a touch panel 400 arranged in front of the display panel 40, and a touch panel control section 410 configured to control the operation of the touch panel 400. The touch panel 400 may be an in-cell touch panel having its function incorporated inside the display panel 40. The touch panel control section 410 detects the touch position (coordinates), and outputs the detected coordinate information to the output control section 106 of the system unit 100. As the method of detecting the touch position, a known method can be used. For example, the display system detects the touch position with use of a capacitive system.

In the display system illustrated in FIG. 5, when the frame image is a moving image, the output control section 106 causes the output section 107 to output the frame image data acquired from the image determining section 103. Further, when the frame image is a moving image and the coordinate information of the touch position is acquired from the touch panel control section 410, the output control section 106 synthesizes, based on the coordinate information, the pointer image read out from the pointer image memory 111 with the frame image acquired from the image determining section 103, and causes the output section 107 to output the synthesized frame image data.

On the other hand, when the frame image is a still image, the output control section 106 causes the output section 107 to stop the operation of outputting the frame image data.

Further, when the frame image is a still image and the coordinate information of the touch position is acquired from the touch panel control section 410, the output control section 106 causes the output section 107 to output the coordinate information.

The operations of the system unit 100 and the timing controller 10 illustrated in FIG. 5 are the same as those in the configuration illustrated in FIG. 1 to FIG. 3.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
   a timing controller configured to generate display image data based on image data output from a system unit that is externally provided; and
   a display panel configured to display a display image including a pointer image based on the display image data,
   the timing controller comprising:
      a receiving section configured to receive, from the system unit, the image data and positional information representing a position of the pointer image in a display region;
      an internal image memory configured to store the image data received by the receiving section as internal image data; and
      a data generating section configured to generate the display image data,
   the display device comprising:
      a first display mode of displaying, when an operation of outputting the image data is stopped in the system unit, the display image based on the internal image data stored in the internal image memory; and
      a second display mode of displaying, in accordance with the operation of outputting the image data in the system unit, the display image based on the image data received by the receiving section,
   the data generating section being configured to generate, when the receiving section receives the positional information in the first display mode, the display image data corresponding to the display image based on an image corresponding to the internal image data stored in the internal image memory, the pointer image, and the positional information,
   wherein when the receiving section receives positional information representing a position of the pointer image to be changed in a display region during the first display mode of displaying, the state of stopping the operation of outputting the image is maintained.

2. The display device according to claim 1, wherein the data generating section synthesizes the pointer image with the image corresponding to the internal image data at a position corresponding to the positional information, to thereby generate the display image data corresponding to the display image.

3. The display device according to claim 1, wherein the display panel displays a still image in the first display mode, and displays a moving image in the second display mode.

4. The display device according to claim 1, wherein, in the first display mode, the receiving section does not receive the image data, but receives the positional information representing the position of the pointer image.

5. The display device according to claim 1, further comprising a pointer image memory configured to store pointer image data corresponding to the pointer image, wherein, when the receiving section receives the positional information in the first display mode, the data generating section generates the display image data corresponding to the display image based on the image corresponding to the internal image data stored in the internal image memory, the pointer image corresponding to the pointer image data stored in the pointer image memory, and the positional information.

6. The display device according to claim 5, wherein, when the display device is activated, the pointer image data output from the system unit is stored in the pointer image memory.

7. A method of driving a display device, the display device comprising:

a timing controller configured to generate display image data based on image data output from a system unit that is externally provided; and a display panel configured to display a display image including a pointer image based on the display image data, the timing controller comprising:

a receiving section configured to receive, from the system unit, the image data and positional information representing a position of the pointer image in a display region;

an internal image memory configured to store the image data received by the receiving section as internal image data; and a data generating section configured to generate the display image data, the method of driving the display device comprising:

a first display mode of displaying, when an operation of outputting the image data is stopped in the system unit, the display image based on the internal image data stored in the internal image memory; and a second display mode of displaying, in accordance with the operation of outputting the image data in the system unit, the display image based on the image data received by the receiving section, the data generating section being configured to generate, when the receiving section receives the positional information in the first display mode, the display image data corresponding to the display image based on an image corresponding to the internal image data stored in the internal image memory, the pointer image, and the positional information, wherein when the receiving section receives positional information representing a position of the pointer image to be changed in a display region during the first display mode of displaying, the state of stopping the operation of outputting the image is maintained.

8. A display system, comprising:

a system unit configured to transmit image data and positional information representing a position of a pointer image in a display region;

a timing controller configured to generate display image data based on the image data output from the system unit; and a display panel configured to display a display image including the pointer image based on the display image data, the system unit comprising a position detecting section configured to detect the position of the pointer image in the display region, the timing controller comprising:

a receiving section configured to receive the image data and the positional information from the system unit;

an internal image memory configured to store the image data received by the receiving section as internal image data; and a data generating section configured to generate the display image data, the display system comprising:

a first display mode of displaying, when an operation of outputting the image data is stopped in the system unit, the display image based on the internal image data stored in the internal image memory; and a second display mode of displaying, in accordance with the operation of outputting the image data in the system unit, the display image based on the image data received by the receiving section, the data generating section being configured to generate, when the receiving section receives the positional information in the first display mode, the display image data corresponding to the display image based on an image corresponding to the internal image data stored in the internal image memory, the pointer image, and the positional information, wherein when the receiving section receives positional information representing a position of the pointer image to be changed in a display region during the first display mode of displaying, the state of stooping the operation of outputting the image is maintained.

9. The display system according to claim 8, wherein, in the first display mode, the system unit does not transmit the image data, but transmits the positional information detected by the position detecting section to the timing controller.

10. The display system according to claim 8, wherein the system unit transmits, to the timing controller, a first control signal representing a command to stop an output of the image data and a second control signal representing a command to execute the output of the image data.

11. The display system according to claim 10, wherein the system unit further comprises an image determining section configured to determine whether the image corresponding to the image data is a still image or a moving image, and wherein the system unit transmits the first control signal to the timing controller at a timing at which the image is switched from the moving image to the still image, and transmits the second control signal to the timing controller at a timing at which the image is switched from the still image to the moving image.

* * * * *